United States Patent [19]

Zahid

[11] 3,881,519
[45] May 6, 1975

[54] PRESSURE VESSEL

[75] Inventor: Abduz Zahid, Monterey Park, Calif.

[73] Assignee: Greer Hydraulics, Inc., Los Angeles, Calif.

[22] Filed: June 5, 1973

[21] Appl. No.: 367,231

Related U.S. Application Data

[63] Continuation-in-part of Ser. No. 353,544, April 23, 1973, abandoned.

[52] U.S. Cl. .................... 138/30; 137/525; 141/20; 251/331; 251/335 B
[51] Int. Cl. ............................................. F16l 55/04
[58] Field of Search ........ 138/30; 251/149.1, 149.6, 251/331, 335 A, 335 B; 141/20, 38; 137/525

[56] References Cited
UNITED STATES PATENTS

| | | | |
|---|---|---|---|
| 2,801,067 | 7/1957 | Mercier | 138/30 X |
| 2,952,278 | 9/1960 | Waldherr | 141/20 |
| 3,251,380 | 5/1966 | Mercier | 138/30 |
| 3,348,742 | 10/1967 | Assalit | 251/331 X |
| 3,586,068 | 6/1971 | Nicholson | 141/20 |
| 3,726,282 | 4/1973 | Patel | 251/149.6 X |

Primary Examiner—John W. Huckert
Assistant Examiner—Charles Gorenstein
Attorney, Agent, or Firm—Arthur B. Colvin

[57] ABSTRACT

This invention relates to the art of pressure vessels of the type comprising a rigid container having an opening at one end and an oil port at its other end. The container has a deformable partition therein intervening between the opening and the oil port and defining a gas chamber and an oil chamber. A rigid member is secured in the opening of the container and has a bore therethrough. A layer of resilient material, which defines a disc portion extends over the inner end of the bore. The periphery of such disc portion is bonded to the surface of the rigid member through which the inner end of the bore extends, said disc portion having passage means therethrough positioned between the bonded periphery thereof and the axis thereof, the inner end of such passage means normally abutting against such surface, the portion of said disc inwardly of its bonded periphery being movable away from such surface.

13 Claims, 7 Drawing Figures

PRESSURE VESSEL

This application is a continuation-in-part of copending application Ser. No. 353,544, filed Apr. 23, 1973 now abandoned.

As conducive to an understanding of the invention, it is noted that where a pressure vessel is of the type comprising a rigid container with a deformable bladder therein intervening between two ports through one of which fluid, such as oil, may flow into and out of the chamber defined between the exterior of the bladder and the rigid container, and through the other of which the bladder is charged with gas under pressure, where the length of the container is sufficiently greater than its diameter so that the correspondingly elongated bladder when compressed, can fold against the inner end of the gas port, extrusion of such bladder into such port is likely to incur with resultant damage or destruction of the bladder and failure of the unit.

It is accordingly among the objects of the invention to provide a pressure vessel of the above type which may readily be manufactured at relatively low cost and which will insure that no damage will occur to the bladder therein even if the latter should fold across the gas inlet port through which it is charged.

According to the invention, these objects are accomplished by the arrangement and combination of elements hereinafter described and more particularly recited in the claims.

In the accompanying drawings in which are shown various possible embodiments of the several features of the invention, FIG. 1 is a longitudinal cross sectional view with parts broken away of a pressure vessel made in accordance with the invention hereof;

Figure 1:
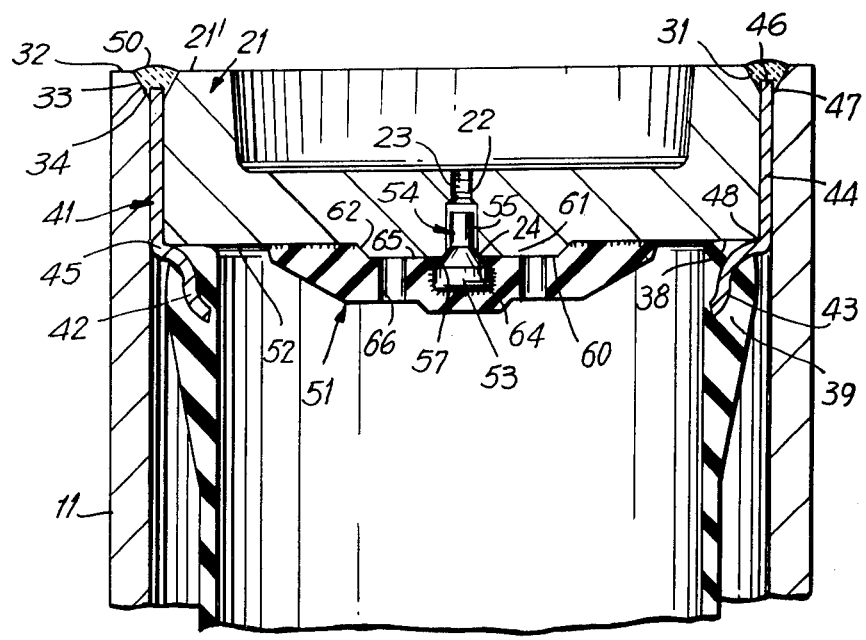

Referring now to the drawings, the pressure vessel illustratively comprises a substantially cylindrical container 11 of rigid material such as steel or aluminum capable of withstanding the pressure to which it is to be subjected in use.

The container has one end closed as at 12 and a perforated disc or screen 13 is secured as by welding at 14 on an annular seat 15 at the inner end of an axial opening in such closed end 12, a tubular sleeve 16 extending therefrom defining the oil port 17.

Positioned in the mouth of the container 11 remote from the closed end 12 thereof is a rigid member such as a closure or cover member 21 which has an axial bore 22 therethrough, illustratively internally threaded at its outer end as at 23. The inner end of the bore 22 is outwardly beveled to define a valve seat 24.

The periphery of said closure head at its outer surface is beveled as at 31 and the inner surface of the outer end or mouth 32 of such container 11 has a corresponding bevel 33. The two beveled surfaces 31 and 33, when the closure head is positioned in the mouth 32 of the container, form a V groove 34.

Positioned in the container 11 is a deformable partition illustratively in the form of an elongated bladder 35, of rubber or similar material having like characteristics. In the illustrative embodiment shown, the diameter of the bladder is approximately one-tenth the length thereof, and the dimension of the container is of corresponding size.

The bladder 35 is closed at one end as at 36, and such closed end 36 is designed to move against the perforated disc 13 when the bladder is expanded, to close the port 17, the perforations 30 in the disc being of sufficiently small size as to preclude extrusion of the expanded bladder therethrough, yet still permit rapid flow of liquid.

The mouth 38 of the bladder has a thickened rim 39 to which an annular supporting member 41 is affixed by being bonded thereto or molded therein, as illustratively shown. The supporting member or ring 41 is of relatively thin, resilient sheet metal such as sheet steel and has a curved lower or mounting portion 42, convex at its outer surface as at 43, and an upper or retaining portion 44.

The lower portion 42 is molded integrally into the thickened rim 39 of the bladder 35 with the upper portion 44 being transversely spaced outwardly from the lower portion 42 to define an annular seating shoulder 45.

Inasmuch as it is costly to hold diametrical tolerances on deep drawn low cost shells as well as on metallic rings, the upper portion 44 of the supporting member 41 initially tapers slightly outwardly so that the outer diameter of its free edge 46 is just slightly greater than the inner diameter of the container 11 adjacent the mouth 32 thereof and below the beveled surface 33.

Thus, when such upper portion 44 is forced into the mouth of the container it will readily fit therein with a snug fit.

The supporting ring is forced into the container mouth to an extent such that the upper or outer edge portion 46 of the supporting member 41 will protrude outwardly slightly beyond the lower end 47 of the beveled surface 33. Due to the slight outward taper of the upper portion 44 of the supporting member, its outer surface will press snugly against the inner surface of the container just slightly below the lower end 47 of beveled surface 33, without any discontinuities or gaps.

As shown in FIG. 1, the closure member 21 is positioned in the substantially cylindrical upper portion 44 of the supporting member with the peripheral rim 48 of the closure member resting against seating shoulder 45 of the supporting member. In such position, the top surface 21' of the closure member is substantially flush with the mouth 32 of the container and the beveled surface 31 of the closure member is aligned with the beveled surface 33 of the container to define the V groove 34. The upper edge 46 of the supporting member 41 will thus protrude upwardly into the groove 34 beyond the apex thereof.

Preferably the closure member 21 fits relatively loosely in the supporting ring 41 to insure that the peripheral rim 48 of the closure member 21 will rest on the seating shoulder 45 in order that the upper portion 46 of the supporting ring will protrude freely into V groove 34.

In order to provide a dependable gas and liquid seal, a weld 50 is formed in the V groove 34 which will securely join the opposed beveled surfaces 31, 33 as well as the protruding portion 46 of the supporting ring 41 together.

According to the invention, a thick layer of rubber or similar material having like characteristics, which defines a disc portion 51 is secured to the inner surface 52 of the closure head 21.

Figure 2:
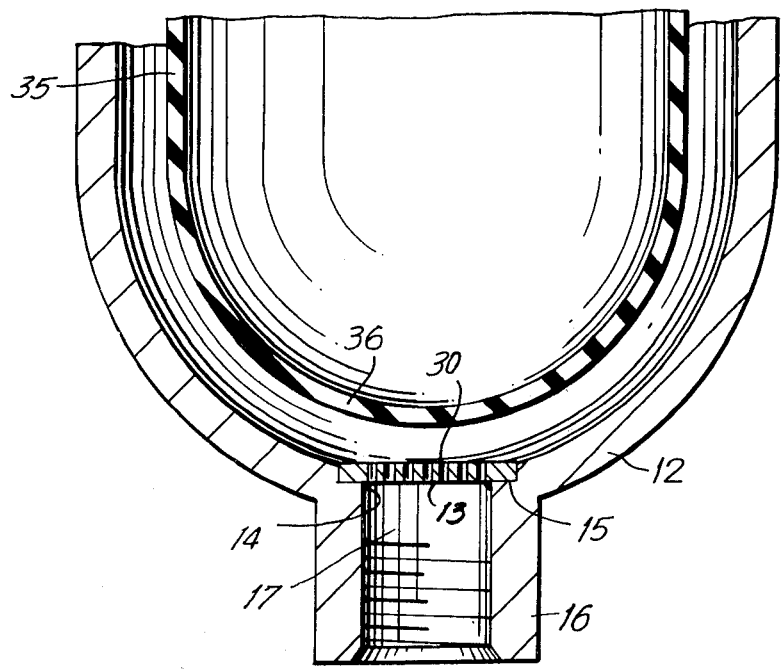
FIG. 2 is a fragmentary enlarged detail view showing the gas port in open position.
Figure 2:
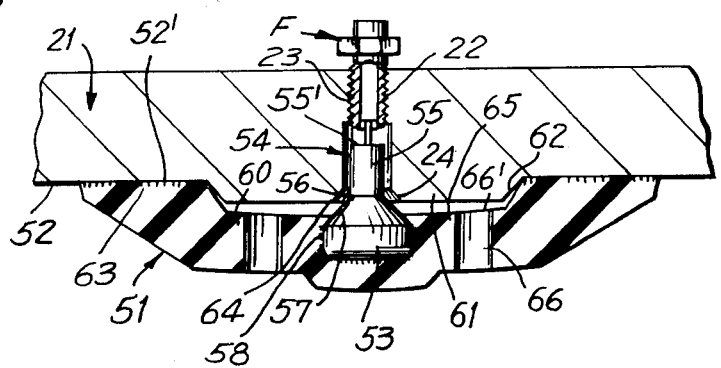

The disc 51 preferably is molded integrally with the closure head 21 and as is clearly shown in FIGS. 1 and 2, the disc 51 has molded integrally therewith and embedded therein, the head 53 of a valve member 54.

As is clearly shown, the valve member 54 has an axial stem 55 of diameter just slightly smaller than the diameter of bore 22 so that it will fit therein with slight clearance to permit ready movement of the stem 55 in bore 22 and the passage of gas past the stem in the manner hereinafter to be described.

The portion of the valve member 54 between the root end 56 of the stem and the head 53 of the valve member is beveled as at 57 so that it may move against the seat 24 to define a metal to metal seal.

In initially forming the disc 51 with its embedded valve member 54, the head 53 is coated with a suitable cement as at 58 so that the material of the disc will bond securely thereto.

As shown in FIG. 1, the inner surface of the closure head 21 has an axial boss 61, the periphery of which defines an annular beveled shoulder 62.

The annular portion 52' of surface 52 adjacent the shoulder 62 is coated with a suitable cement so that during the molding operation to form the disc 51, the peripheral portion 63 of the disc will bond securely to the annular portion 52' of surface 52 and the portion 60 of the disc 51 between shoulder 62 and the outer edge 64 of the valve seat 24 will be free to move away from the opposed portion of surface 62 as shown at 65 in FIG. 2.

The disc 51 has a plurality of circumferentially spaced bores 66 therethrough located in the central portion 65 thereof which define passageways which will permit flow of gas from the bore 22 into the bladder 35 in the manner hereinafter to be described.

In FIG. 1 the bladder 35 is shown in its distended but uncharged and unstretched condition. At this time, the disc 51 is in its normal position shown in FIG. 1 with the undersurface or central portion 65 of the disc against the surface of boss 61.

To charge the bladder 32 with gas under pressure, a conventional gas charging fitting F is screwed into the threaded end 23 of bore 22, the usual projection of the fitting pressing against the end 55' of stem 55 to move the latter and the valve head 53 to the position shown in FIG. 2. As a result, the beveled portion 57 of valve head 53 will be moved away from its seat 24 and the central portion 65 of disc 51 will be moved away from the surface of boss 61 to expose the inner ends 66' of bores 66. This will provide a free passageway for gas under pressure to pass through the bores 66 into the bladder 35 to charge the latter.

So long as the charging fitting F remains in the threaded bore 32, the bores 66 will provide a free passageway for gas under pressure. When the bladder is fully charged, the fitting F is removed from bore 22. This will cause the central portion 65 of disc 51 to resume its normal position shown in FIG. 1 since the projection of the fitting will no longer be pressed against the end 55' of stem 55.

As a result, the inner ends 66' of bores 66 will press against the surface of boss 61 to seal off the passageways 66 to prevent further flow of gas therethrough so that the bladder will remain fully charged.

In addition, by reason of the gas pressure in the charged bladder 35 reacting against the disc 51, the movable central portion 65 thereof will be tightly pressed against the surface of boss 61 deforming the rubber disc slightly and insuring that the inner ends 66' of bore 66 will remain tightly pressed against the surface of boss 61 to provide a dependable seal for such bores.

Figure 3:
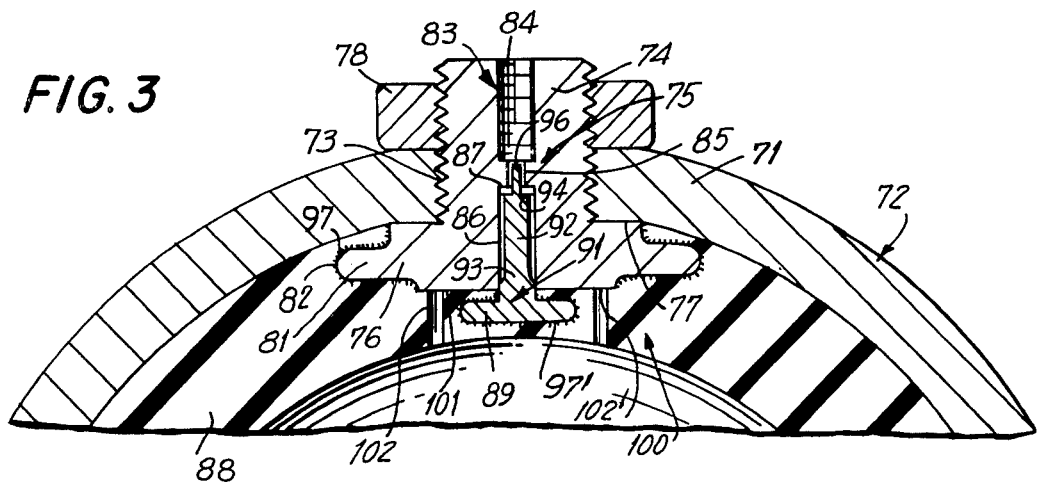
FIG. 3 is a fragmentary detail sectional view showing another embodiment of the invention.
Figure 4:
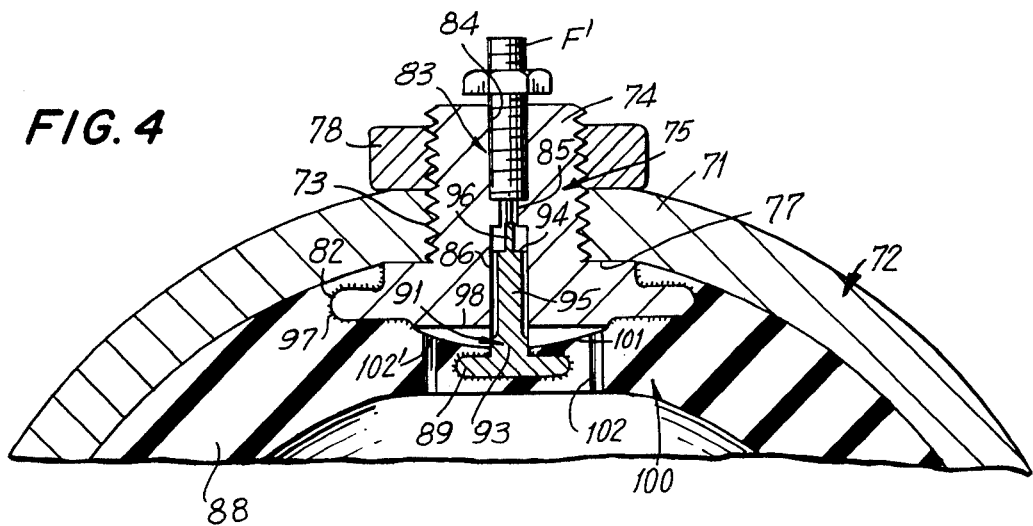
FIGS. 4 and 5 are views similar to FIG. 3 showing different operating positions.
Figure 5:
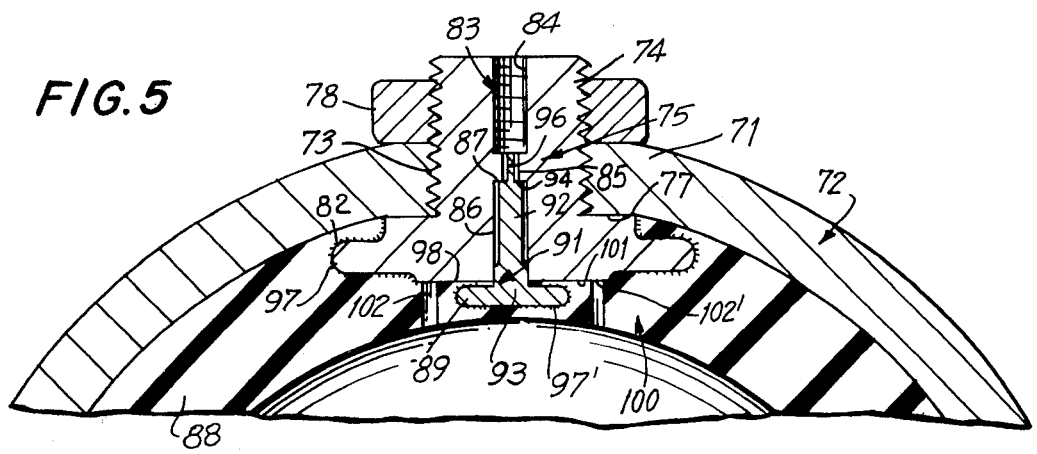

In the embodiment shown in FIGS. 3 to 5, the end 71 of the container 72 is closed and has an axial bore 73, through which extends the exteriorly threaded stem 74 of a fitting 75. The stem 74 at its root end, has formed integral therewith a base disc 76, the surface 77 of which, adjacent such root end, is adapted to abut against the periphery of bore 73 when a nut 78 screwed on the protruding threaded end of stem 74 is tightened, securely to lock the fitting 75 in bore 73.

The base disc 76 has an outstanding lateral flange 81 spaced from surface 77 and having a rounded periphery 82. The fitting 75 has an axial bore 83 therethrough externally threaded at its outer end as at 84. The bore 83 is of reduced diameter as at 85 between its outer end 84 and its inner end 86 defining an annular stop shoulder 87.

The fitting 75 is molded integrally with the bladder 88 and as is clearly shown in FIG. 3 to 5 inclusive, the head 89 of a valve member 91 is also molded integrally with the bladder.

As is shown, the valve member 91 has a stem 92 extending axially from said head 89, the stem having a diameter adjacent its root end as at 93 just slightly smaller than that of the inner end portion of bore 83 so that it will fit therein with slight clearance. The stem between the portion 93 thereof and its free end 94 is of reduced diameter as at 95 and such free end has a reduced diameter projection 96 extending axially therefrom into reduced diameter bore portion 85, the diameter of portion 96 being less than bore portion 85 to permit free passage of gas therethrough.

In initially molding the bladder with the fitting 75, the periphery of the base disc 76 including the opposed surfaces of flange 81 and the rounded periphery 82 thereof and the valve head 89 are coated with a suitable cement as at 97, 97' so that the material of the bladder will bond securely thereto.

As shown in FIGS. 3 to 5, the inner surface of the base disc 76 has a slightly protruding circular boss 98 which remains uncoated. As a result, during the molding operation, to form the bladder 88, the material of the bladder which defines a disc portion 100 will have its periphery bonded securely to the coated portion 97, 97' of the base disc and valve head 89, and the portion 101 of the bladder adjacent the boss 98 will be free to move away from the opposed surface of boss 98.

The axial portion 101 of the bladder has a plurality of circumferentially spaced bores 102 therethrough which will permit flow of gas from the bore 83 into the bladder 88 in the manner hereinafter to be described.

In FIG. 3 the bladder 88 is shown in its distended but uncharged and unstretched condition. At this time the axial portion 101 of the bladder 88 is in its normal position seated against the adjacent surface of boss 98 and with the end 94 of stem 95 spaced from shoulder 87.

To charge the bladder 88 with gas under pressure, a conventional gas charging fitting F' is screwed into the threaded end 84 of bore 83 as shown in FIG. 4, the usual projection of the fitting pressing against projection 96 to move stem 92 and valve head 89 to the position shown in FIG. 2.

As a result, the central portion 101 of the bladder 88 will be moved away from the surface of boss 98 to expose the inner ends 102' of bores 102. In addition, the enlarged diameter portion 93 of stem 95 will be moved clear of bore portion 86 to provide free passageway for gas under pressure to pass through the bores 102 into the bladder 88 to charge the latter.

So long as the charging fitting F' remains in the threaded bore 83, the bores 102 will provide free passageway for gas under pressure. When the bladder 88 is fully charged, the fitting F' is removed from bore 83. As a result, the stem 95 will be free to move outwardly from the position shown in FIG. 4 to the position shown in FIG. 5.

More particularly, due to the gas pressure in bladder 88 reacting against the central portion of the bladder, such portion will be pressed tightly against boss 98 causing compression of the rubber and sealing of the inner ends 102' of bore 102 to prevent flow of gas thereby retaining the bladder fully charged. By reason of the abutment of the end 94 of stem 95 against shoulder 87, undue compression of the material of the bladder adjacent head 89 is precluded and the metal to metal contact of end 94 and shoulder 87 forms an additional seal.

The embodiments of the invention shown in FIGS. 1 to 5 inclusive are designed for use in pressure vessels capable of being precharged to relatively high pressures, say over 300 psi or 20 atmospheres, in which case the metal valve heads 53, 89 will prevent extrusion of the rubber disc through the charging bore 22, by reason of the abutment of the metal valve head against its rigid metal seat.

In cases where the precharge into the bladder is relatively low, say below 300 psi, the rubber disc portion is sufficiently strong to resist extrusion, especially where it is merely necessary to hold the precharge temporarily after the bladder is charged and the gas charging bore is to be subsequently sealed.

Figure 6:
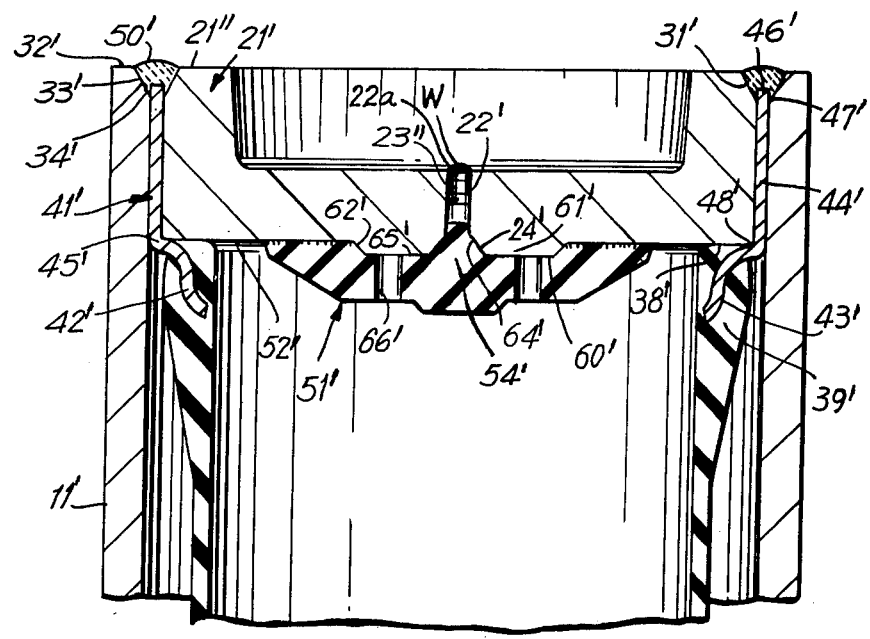
FIG. 6 is a view similar to FIG. 1 of still another embodiment of the invention.

In such case, to simplify the construction and hence reduce its cost, the metal valve member may be eliminated as shown in FIG. 6, which corresponds substantially identically to the embodiment of FIGS. 1 and 2, except for the elimination of valve head 53.

Figure 7:
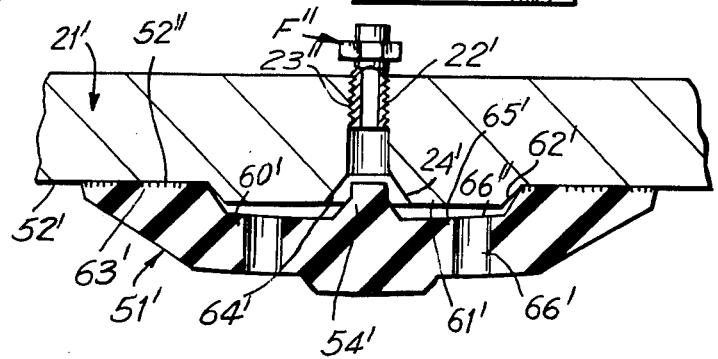
FIG. 7 is a fragmentary enlarged detail view showing the gas port of FIG. 6 in open position.

Referring to FIGS. 6 and 7, in which parts corresponding to those in FIGS. 1 and 2 have the same reference numerals primed, the disc portion 51' has an axial frusto-conical projection formed as an integral part of the disc portion 51' during the molding thereof and defining a valve head 54' normally resting on seat 24' at the inner end of bore 22' to define a seal for such bore.

To charge the bladder 35' with gas under pressure, a conventional gas charging fitting F'' is screwed into the threaded end 23' of bore 22' and gas under pressure is then forced through the fitting into bore 22'.

As a result of the gas reacting against the resilient valve head 54' the latter will be moved inwardly away from seat 24' and simultaneously the central portion 65' of disc 51' will be moved away from the surface of boss 61' on which it normally rests, to expose the inner ends 66'' of bores 66'. This will provide a free passageway for gas under pressure to pass through the bores 66' into the bladder 35' to charge the latter.

When the bladder is fully charged and the gas source cut off, due to the relief of the force against the resilient valve head 54' and due to the resilience of the central portion 65' of disc 51', the latter will move outwardly so that the inner ends 66'' of bores 66' are again pressed against the surface of boss 61' to cut off communication between the charged bladder 35' and the charging bore 22'.

In addition, by reason of the gas pressure in the charged bladder 35' reacting against the disc 51', the movable central portion 65' thereof will be tightly pressed against the surface of boss 61', deforming the rubber disc slightly and insuring that the inner ends 66'' of bores 66' will remain tightly pressed against the surface of boss 61' to provide dependable seal of such bores.

The sealing arrangement thus described is sufficient to hold the low pressure gas precharge temporarily in the bladder without leakage for sufficient period of time to permit subsequent removal of the gas charging fitting F'' and closure of the outer end 22a of charging bore 22' as by welding at W.

Having thus described my invention, what I claim as new and desire to secure by Letters Patent of the United States is:

1. A pressure vessel comprising a container of rigid material having an opening at one end and an oil port at the other end, a deformable partition in said container intervening between said opening and said oil port and defining a gas chamber and an oil chamber on opposed sides thereof respectively, a rigid member secured in said opening and presenting a generally planar inner surface, said member having a bore therethrough defining a gas port having its inner end opening through said inner surface adjacent said gas chamber, a layer of resilient material generally paralleling and overlying said inner surface and defining a disc portion extending over the inner end of said bore, the periphery of said disc portion being bonded to the inner surface of said rigid member through which the inner end of said bore opens, the central portion of said disc portion being movable toward and away from said surface and having passage means therethrough with one end opening toward the rigid member inner surface whereby gas introduced under pressure through said gas port may be charged into the gas chamber, said passage means being positioned laterally remote from said gas port and between the bonded periphery and the axis of said portion, the central portion of said disc portion, in the relaxed position thereof, being retained against said surface of said rigid member and both closing and sealing said gas port by engagement of the disc portion against the inner end of the bore and both closing and sealing said passage means by engagement of said one end of the passage means against the inner surface of the rigid member, said central portion upon movement away from said surface, opening both the gas port and the passage means to provide communication between said gas port and said gas chamber.

2. The combination set forth in claim 1 in which an actuating member is slidably mounted in said bore and has its inner end protruding therefrom and operatively connected to said central portion to effect movement of the latter away from said surface when said actuating member is moved inwardly in said bore.

3. The combination set forth in claim 2 in which the protruding end of said actuating member is enlarged and defines a head at least partially embedded in the axis of said central portion.

4. The combination set forth in claim 2 in which said passage means comprises a plurality of bores extending through the central portion of said layer of resilient material, the ends of said bores adjacent said surface of said rigid member being normally pressed thereagainst to close said bores.

5. The combination set forth in claim 2 in which a portion of said bore is conformed to define an annular valve seat and a portion of said actuating member is movable against said seat when said gas chamber is charged with gas under pressure to act as a valve to close said bore in said rigid member.

6. The combination set forth in claim 2 in which the protruding end of said actuating member is enlarged and defines a head at least partially embedded in the axis of said central portion, said passage means being located between said bonded periphery and said actuating head, the inner end of said bore is beveled to define a valve seat, and the portion of said head adjacent said seat is correspondingly beveled and is normally retained against said seat to close said bore.

7. The combination set forth in claim 2 in which said bore is of reduced diameter between its ends defining an annular valve seat, the outer end of said actuating member is normally spaced from said seat and is movable thereagainst when said gas chamber is charged with gas under pressure to close said bore.

8. The combination set forth in claim 1 in which said rigid member comprises a cylindrical cover member affixed in the opening in said container, said layer of resilient material comprises a disc of diameter less than that of said cover member.

9. The combination set forth in claim 1 in which said partition comprises an elongated bladder closed at one end, said rigid member comprising a cylindrical externally threaded sleeve extending through the opening in said container, the inner end of said sleeve having a base disc integral therewith and positioned in the central portion of the opposed end of said bladder, the portion of said bladder material in juxtaposition with the inner surface of said base disc defining said disc portion.

10. The combination set forth in claim 1 in which a valve member extends axially outward from the outer surface of said disc portion adjacent the surface of the rigid member through which the bore extends and is retained against the inner end of said bore to seal the latter.

11. The combination set forth in claim 10 in which the inner end of said bore is conformed to define a valve seat and the valve member is substantially frusto-conical.

12. The combination set forth in claim 10 in which said valve member is of resilient material formed integrally with the layer of resilient material defining said disc portion.

13. The combination set forth in claim 10 in which said valve member is rigid and precludes deformation of the valve member and resilient disc into said bore.

* * * * *